US009734713B2

(12) United States Patent
Levy et al.

(10) Patent No.: US 9,734,713 B2
(45) Date of Patent: Aug. 15, 2017

(54) PARKING OCCUPANCY ESTIMATION

(71) Applicant: ANAGOG LTD., Ramot Meir (IL)

(72) Inventors: Gil Levy, Ramot Meir (IL); Yaron Aizenbud, Haifa (IL)

(73) Assignee: ANAGOG LTD., Tel Aviv (IL)

( * ) Notice: Subject to any disclaimer, the term of this patent is extended or adjusted under 35 U.S.C. 154(b) by 0 days.

(21) Appl. No.: 14/907,657

(22) PCT Filed: Jul. 24, 2014

(86) PCT No.: PCT/IL2014/050672
§ 371 (c)(1),
(2) Date: Jan. 26, 2016

(87) PCT Pub. No.: WO2015/011708
PCT Pub. Date: Jan. 29, 2015

(65) Prior Publication Data

US 2016/0163197 A1 Jun. 9, 2016

Related U.S. Application Data

(60) Provisional application No. 61/858,644, filed on Jul. 26, 2013.

(51) Int. Cl.
*B60Q 1/48* (2006.01)
*G08G 1/14* (2006.01)

(52) U.S. Cl.
CPC ............ *G08G 1/147* (2013.01); *G08G 1/144* (2013.01)

(58) Field of Classification Search
CPC ...................................................... G08G 1/147
USPC ...................................................... 340/932.2
See application file for complete search history.

(56) References Cited

U.S. PATENT DOCUMENTS

2009/0171566 A1* 7/2009 Morimoto .......... G01C 21/3453 701/465
2010/0052946 A1* 3/2010 Levine .................. G08G 1/143 340/932.2
2012/0161986 A1* 6/2012 Amir ................. G01C 21/3685 340/932.2

OTHER PUBLICATIONS

International Search Report for PCT/IL2014/050672 (dated Nov. 16, 2014).

* cited by examiner

*Primary Examiner* — Kerri McNally
(74) *Attorney, Agent, or Firm* — Koffsky Schwalb LLC; Mark I. Koffsky

(57) ABSTRACT

Methods, systems and computer program product for determining parking occupancy. In some embodiments, the parking occupancy is determined based on at least one distance between a parking location of a user and a destination of the user. In some embodiments, the parking occupancy is determined based on one or more parking instances in a paid parking lot and is based on the distance from the paid parking lot. In some embodiments, the parking occupancy is determined based on at least one route of a vehicle while searching for parking. In some embodiments, the parking occupancy is determined based on a parking curve. The parking occupancy can be used to compute an estimated arrival time which includes an estimated searching for parking time. The parking occupancy information can be used to rank parking areas.

60 Claims, 8 Drawing Sheets

PARKING OCCUPANCY ESTIMATION

CROSS-REFERENCE TO RELATED APPLICATION

This application claims the benefit of U.S. Provisional Application No. 61/858,644 filed Jul. 26, 2013, entitled "PARKING OCCUPANCY ESTIMATION", which is hereby incorporated by reference in its entirety.

TECHNICAL FIELD

The present disclosure relates to parking data analysis in general, and to automatically estimating parking occupancy, in particular.

BACKGROUND

The average parking occupancy in a street or in a street segment may vary according to the hour in the day or the day in the week. It may further vary in different months or seasons, in holiday times and when streets are being reconstructed.

Parking occupancy information in a certain area may be highly valuable information for drivers. If a driver is provided with such information she can better know when to plan to leave and start her trip to a designated location, taking into account parking time and walking distance from the parking spot to the designated location. In some cases, drivers may take into account estimated parking availability in a target location to better plan rides.

The parking occupancy can be predictable with periodic nature and it can sometimes be un-predictable due to weather conditions, a concert, a football game, accidents, road constructions etc.

BRIEF SUMMARY

One exemplary embodiment of the disclosed subject matter is a computer-implemented method comprising: obtaining a parking location and a destination; computing, by a processor, a distance between the parking location and the destination; determining, by the processor, a parking occupancy based on the distance; and outputting the parking occupancy.

Another exemplary embodiment of the disclosed subject matter is a computer-implemented method comprising: obtaining a location of a paid parking lot and a time of parking in the paid parking lot; obtaining a target location for which parking occupancy is to be computed; computing, by a processor, a distance between the target location and the location of the paid parking lot; determining, by the processor, a parking occupancy based on the distance, wherein the parking occupancy is proportional to the distance, whereby a parking instance in the paid parking lot is used to estimate parking occupancy outside the paid parking lot; and outputting the parking occupancy.

Yet another exemplary embodiment of the disclosed subject matter is a computer-implemented method comprising: determining that a vehicle that is driving is searching for a parking space; tracking a route of the vehicle while searching for the parking space; determining, by a processor, a parking occupancy for a target location based on the route of the vehicle; and outputting the parking occupancy.

Yet another exemplary embodiment of the disclosed subject matter is a computer-implemented method comprising: determining that a vehicle that is driving is searching for a parking space; tracking a route of the vehicle while searching for the parking space; determining, by a processor, a parking occupancy for a target location based on the route of the vehicle; and outputting the parking occupancy.

Yet another exemplary embodiment of the disclosed subject matter is a computer-implemented method comprising: obtaining a target location; obtaining a target time; obtaining a parking curve indicative of number of used parking spots at a parking zone at different times, wherein the parking curve is defined based on a parking usage dataset which comprises a plurality of records, wherein each record comprises a parking spot location, a parking start time, and a parking end time, wherein the parking usage dataset is a sample of the usage of parking spots by vehicles parking at the parking zone; and determining, by a processor, the parking occupancy of the target location at the target time based on the parking curve; and outputting the parking occupancy.

Yet another exemplary embodiment of the disclosed subject matter is a computer-implemented method comprising: obtaining a current location and a target location; computing, by a processor, an estimated driving time from the current location to the target location; obtaining an estimated parking occupancy at the target destination; determining, by the processor, an estimated searching for parking time at the target location based on the estimated parking occupancy; computing, by the processor, an estimated time of arrival based on the estimated driving time and on the estimated parking time.

Yet another exemplary embodiment of the disclosed subject matter is a computer-implemented method comprising: obtaining from a plurality of mobile devices of users, a plurality of parking instances, wherein each parking instance comprises a parking location and a parking time; ranking, by a processor, a set of parking areas at a target time, wherein said ranking comprises: computing a popularity measurement of each parking area at the target time based on the plurality of parking instances; and outputting an indication to a user of said ranking.

Yet another exemplary embodiment of the disclosed subject matter is a computerized apparatus having a processor, the processor being adapted to perform the steps of: obtaining a parking location and a destination; computing a distance between the parking location and the destination; determining a parking occupancy based on the distance; and outputting the parking occupancy.

Yet another exemplary embodiment of the disclosed subject matter is a computerized apparatus having a processor, the processor being adapted to perform the steps of: obtaining a location of a paid parking lot and a time of parking in the paid parking lot; obtaining a target location for which parking occupancy is to be computed; computing a distance between the target location and the location of the paid parking lot; determining a parking occupancy based on the distance, wherein the parking occupancy is proportional to the distance, whereby a parking instance in the paid parking lot is used to estimate parking occupancy outside the paid parking lot; and outputting the parking occupancy.

Yet another exemplary embodiment of the disclosed subject matter is a computerized apparatus having a processor, the processor being adapted to perform the steps of: determining that a vehicle that is driving is searching for a parking space; tracking a route of the vehicle while searching for the parking space; determining a parking occupancy for a target location based on the route of the vehicle; and outputting the parking occupancy.

Yet another exemplary embodiment of the disclosed subject matter is a computerized apparatus having a processor, the processor being adapted to perform the steps of: obtaining a target location; obtaining a target time; obtaining a parking curve indicative of number of used parking spots at a parking zone at different times, wherein the parking curve is defined based on a parking usage dataset which comprises a plurality of records, wherein each record comprises a parking spot location, a parking start time, and a parking end time, wherein the parking usage dataset is a sample of the usage of parking spots by vehicles parking at the parking zone; and determining the parking occupancy of the target location at the target time based on the parking curve; and outputting the parking occupancy.

Yet another exemplary embodiment of the disclosed subject matter is a computerized apparatus having a processor, the processor being adapted to perform the steps of: obtaining a current location and a target location; computing an estimated driving time from the current location to the target location; obtaining an estimated parking occupancy at the target destination; determining an estimated searching for parking time at the target location based on the estimated parking occupancy; computing an estimated time of arrival based on the estimated driving time and on the estimated searching for parking time.

Yet another exemplary embodiment of the disclosed subject matter is a computerized apparatus having a processor, the processor being adapted to perform the steps of: obtaining from a plurality of mobile devices of users, a plurality of parking instances, wherein each parking instance comprises a parking location and a parking time; ranking a set of parking areas at a target time, wherein said ranking comprises: computing a popularity measurement of each parking area at the target time based on the plurality of parking instances; and outputting an indication to a user of said ranking.

Yet another exemplary embodiment of the disclosed subject matter is a computer program product comprising a computer readable storage medium retaining program instructions, which program instructions when read by a processor, cause the processor to perform a method comprising: obtaining a parking location and a destination; computing a distance between the parking location and the destination; determining a parking occupancy based on the distance; and outputting the parking occupancy.

Yet another exemplary embodiment of the disclosed subject matter is a computer program product comprising a computer readable storage medium retaining program instructions, which program instructions when read by a processor, cause the processor to perform a method comprising: obtaining a location of a paid parking lot and a time of parking in the paid parking lot; obtaining a target location for which parking occupancy is to be computed; computing a distance between the target location and the location of the paid parking lot; determining a parking occupancy based on the distance, wherein the parking occupancy is proportional to the distance, whereby a parking instance in the paid parking lot is used to estimate parking occupancy outside the paid parking lot; and outputting the parking occupancy.

Yet another exemplary embodiment of the disclosed subject matter is a computer program product comprising a computer readable storage medium retaining program instructions, which program instructions when read by a processor, cause the processor to perform a method comprising: determining that a vehicle that is driving is searching for a parking space; tracking a route of the vehicle while searching for the parking space; determining a parking occupancy for a target location based on the route of the vehicle; and outputting the parking occupancy.

Yet another exemplary embodiment of the disclosed subject matter is a computer program product comprising a computer readable storage medium retaining program instructions, which program instructions when read by a processor, cause the processor to perform a method comprising: obtaining a target location; obtaining a target time; obtaining a parking curve indicative of number of used parking spots at a parking zone at different times, wherein the parking curve is defined based on a parking usage dataset which comprises a plurality of records, wherein each record comprises a parking spot location, a parking start time, and a parking end time, wherein the parking usage dataset is a sample of the usage of parking spots by vehicles parking at the parking zone; and determining the parking occupancy of the target location at the target time based on the parking curve; and outputting the parking occupancy.

Yet another exemplary embodiment of the disclosed subject matter is a computer program product comprising a computer readable storage medium retaining program instructions, which program instructions when read by a processor, cause the processor to perform a method comprising: obtaining a current location and a target location; computing an estimated driving time from the current location to the target location; obtaining an estimated parking occupancy at the target destination; determining an estimated parking time at the target location based on the estimated parking occupancy; computing an estimated time of arrival based on the estimated driving time and on the estimated parking time.

Yet another exemplary embodiment of the disclosed subject matter is a computer program product comprising a computer readable storage medium retaining program instructions, which program instructions when read by a processor, cause the processor to perform a method comprising: obtaining from a plurality of mobile devices of users, a plurality of parking instances, wherein each parking instance comprises a parking location and a parking time; ranking a set of parking areas at a target time, wherein said ranking comprises: computing a popularity measurement of each parking area at the target time based on the plurality of parking instances; and outputting an indication to a user of said ranking.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
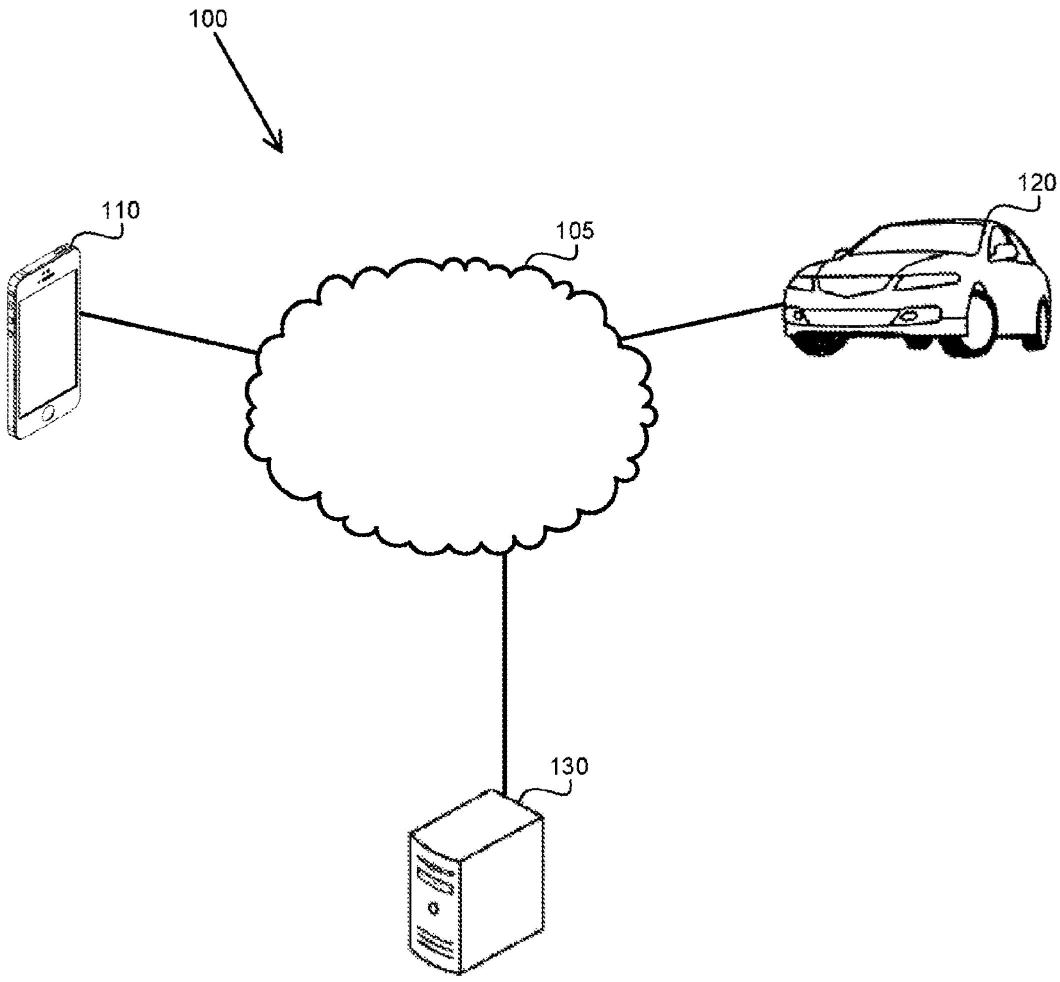
FIG. 1 shows an illustration of a computerized environment, in accordance with some exemplary embodiments of the disclosed subject matter.

One technical problem dealt with by the disclosed subject matter is to provide parking occupancy estimation to users. The parking occupancy may be computed automatically based on information obtained through crowd-sourcing. In some cases, it may be desired to compute the parking occupancy without requiring explicit user input so that the user may not necessarily be aware of the computation.

In some cases, parking occupancy may be indicated by a measurement, such as a number between 0 and 1. In one example, the measurement may be indicative of an estimated probability that a parking spot will be found within a predetermined time frame (e.g., 0% for a highly occupied area and 100% for an area with no parking issues). Additionally or alternatively, the measurement may be a number which indicates an estimated degree of occupancy, such as 0 for no occupancy and 1 for highly occupied.

The disclosed subject matter provides a plurality of methods to compute parking occupancy. The methods may be used separately or in combination.

One technical solution may be to compute parking occupancy based on a distance between a parking location and a destination. In some exemplary embodiments, the destination may be a location to which the user is heading, so that after the user has parked the vehicle in the parking location, the user may proceed toward the destination on foot. A relatively large distance between a location in which the user has parked her car and an actual destination of the user may be indicative of a congestive area near the destination. In some cases, a distance over 50 meters, 100 meters, or the like, may be indicative of an area with high parking occupancy around the destination.

In some exemplary embodiments, the distance and the destination may be used to define an occupancy circle, which defines an area in which parking occupancy is relatively high. It will be noted that in the present disclosure the term "circle" may not be a geometrical circle defined as all the points in a plane that are at a distance of a radius from the center. Instead, the term "circle" may refer to any shape that is loosely based on a geometrical circle, such as a polygon comprised within a circle, a truncated circle, or the like. In some exemplary embodiments, the occupancy circle may have an area that is within a 30% deviation from the area of the geometrical circle (e.g., up to 30% larger area or up to 30% smaller area).

In some cases, the occupancy circle may be divided into rings based on the distance from the destination. Each ring may be associated with a different occupancy level. The more that a ring is external, its occupancy level may be lower, as it may be assumed that the user did not park near the destination due to parking issues that are near that area, while the user was able to park at the parking spot (at the most external ring) which was not occupied.

In some exemplary embodiments, the occupancy circle may be defined based on a geometrical circle and adjusted based on effective distance from the center. Effective distance may take into account a terrain, such as a slope. It may be assumed that if there's a slope, the user may prefer to avoid climbing it (e.g., either way or in one direction). As a result, the effective distance in a slope may be considered higher than a same distance in a plain. Additionally or alternatively, Effective distance may be affected by types of roadways, such as higher effective distance for highways than regular roads. Additionally or alternatively, effective distance may be affected by a type of terrain such as industrial area, residential area, non-constructed area, or the like.

In some cases, the parking location may be determined automatically without user input. As an example, an accelerometer of a mobile device may be used to determine a "driving" or "walking" status of a person carrying the mobile device. When the status changes from "driving" to "walking", the mobile device may determine the location, such as using a positioning device (e.g., GPS receiver, Wi-Fi based triangulation, or the like), and may deduce that the location is the location of the parking spot. Additionally or alternatively, sensors in the parking spots may indicate that a car in which the user is riding has entered a specific parking spot which location is known. Additionally or alternatively, the user may input her parking spot explicitly.

In some exemplary embodiments, the destination may be determined automatically without user input. After the parking location and parking time are established, a timer may be set for a predetermined amount of time, such as 10 minutes, 15 minutes, or the like. After the predetermined amount of time has elapsed, the location of the mobile device carried by the user may be ascertained, and may be estimated as the destination. In some exemplary embodiments, in case it is determined that the user is still changing her location substantially (e.g., having a speed consistent with walking, changing location in a consistent tendency, or the like), the current location may be deemed to be not the destination and the mobile device may be set to reattempt establishing the coordinates of the destination. In some cases, the attempt to automatically determine the location may fail, such as in case it is determined that the mobile device is consistent with "driving" (e.g., based on GPS-determined speed, based on accelerometer readings, or the like). In such a case, the information regarding the specific parking spot of the user may be dropped to avoid tainting a database with unreliable data.

Additionally or alternatively, the user may input her destination manually. In some cases, the user may input her destination to a navigation system, such as a GPS-based navigation system. The input of the user may be used as the destination used for the disclosed subject matter. In some cases, the input by the user of the destination may be provided when the user is navigating to the destination and before the user has parked.

Another technical solution may be to define a parking curve for a parking zone. The parking curve may be defined based on a parking usage dataset. Each record in the dataset may relate to one parking instance and identify a parking location, parking start time and parking end time (or alternatively but equivalently parking start time and parking duration). Based on the parking usage dataset, a number of occupied parking spots in the zone at every time interval may be computed. In some exemplary embodiments, the time interval may be, for example, 15 minutes. The curve may be spread over time, such as over a time of a day, over a time of a week, over a time of a month, or the like. The time span of the curve may allow identifying seasonality, distinguish weekdays from weekends, identifying busy days of the month (e.g., first Monday of the month), or the like. While the parking curve is based on a sample of parking instances, it may be indicative of a parking occupancy in the parking zone. Hence, higher value of the parking curve at a specific time may be indicative of higher parking occupancy.

Yet another technical solution is to use information regarding usage of paid parking lots to determine parking occupancy. In some cases, usage of paid parking lots may be indicative of high congestive area that surrounds the paid parking lots as it may be assumed that the user would prefer to avoid paid parking lots and prefer free parking areas (e.g., by the curve in free spots or even near meters which may be cheaper than paid parking lots). In some cases, information regarding a parking instance in a paid parking lot, may be converted to an occupancy circle around the parking location or around a center location of the parking lot. The radius of the occupancy circle may be a predetermined size, such as 500 meters, 800 meters, or the like. In some exemplary embodiments, the predetermined size may depend on a cost of parking in the paid parking lot such that more expensive lots are associated with larger predetermined sizes. In some cases, a location within the occupancy circle may be considered as having high parking occupancy level. The more that the location is to the center of the occupancy circle, the higher the occupancy level may be—i.e., the parking occupancy may be proportional to the distance. Additionally or alternatively, the occupancy circle may be split into occupancy rings, may be adjusted based on terrain and effective distance, or the like.

In some cases, the above-mentioned may only be applied to vehicles which do not consistently park in parking lots and from their behavior it may be deduced they prefer on-street parking to parking lots, when available.

Yet another technical solution is to track a vehicle while searching for a parking space. A route of the vehicle may be determined and parking spots along the route may be deemed as occupied when the vehicle has passed by. Based on the route, an occupancy circle may be computed. The occupancy circle may be defined based on a destination (estimated, determined, or known). The destination may be determined by tracking a mobile device carried by the user after the vehicle is parked. Additionally or alternatively, the destination may be determined based on input by the user, such as a destination in a navigation system. Additionally or alternatively, the destination may be determined based on the route. As an example, the destination may be computed as a center of a circle comprising the route. As another example, the destination may be computed as a center mass of the vehicle's positions in the route. The occupancy circle may be associated with an occupancy level (or levels, e.g., if split into rings) based on a time in which the vehicle searched for the parking spot. As an example, if the vehicle searches for a parking spot for fifteen minutes the associated occupancy level may be lower than if the search has taken thirty minutes.

Yet another technical solution is to filter out irrelevant information. As an example, if a user has a private parking spot, she may park easily in a congested area. In some cases, tracking the parking spots over time may allow automatic identification that the user uses the same parking spot, and deduce that her information regarding this parking spot does not reflect parking occupancy in the area. Additionally or alternatively, if a user parked in a parking lot that parking may be filtered out or taken into account differently.

One technical effect of the disclosed subject matter is to allow crowd sourcing of information obtained by mobile device's of users to provide for a parking occupancy database. In some cases, parking occupancy may be estimated based on real-time information. Additionally or alternatively, parking occupancy may be estimated based on patterns identified over time in the historic records. Parking occupancy information may be used to resolve user queries, to rank search results, or the like.

Another technical effect is providing for occupancy circles from different sources or different computation mechanisms to be overlaid and aggregated to compute a parking occupancy for a target location. The target location may be a zone, such as a zone defined by a circle (e.g. 500 feet radius circle), a neighborhood a street, a street segment, or the like.

Yet another technical effect is deducing on-street parking availability from information not directly linked to the on-street parking. If drivers park in a certain time and area in a paid parking lot it can indicate of on-street availability in that area since on-street parking availability may be cheaper.

Referring now to FIG. 1 showing an illustration of a computerized environment, in accordance with some exemplary embodiments of the disclosed subject matter.

Computerized Environment 100 comprises a Parking Occupancy Server 130 connected to a Network 105, such as a Local Area Network (LAN), Wide Area Network (WAN), intranet, the Internet, or the like. Parking Occupancy Server 130 may be a processing device which obtains information from external sources, such as Mobile Device 110 and Vehicle 120, and computes parking occupancy information. In some cases, a user (not shown) may view the parking occupancy information, such as in a graphical manner indicating by colors a parking occupancy level of each parking zone. In some exemplary embodiments, the parking occupancy information may be used to analyze and process user queries, such as by computing estimated time until arrival to destination, including parking and walking time.

In some exemplary embodiments, parking occupancy information may be used to rank search results so that search results with lower parking occupancy will be ranked in a higher position. For example, a search for a coffee shop may be ranked based on the parking occupancy in the area in which the coffee shop is located, at the street of the coffee shop, or the like.

Mobile Device 110, such as a Personal Digital Assistance (PDA), a tablet, a mobile phone, a smartphone, a cellular phone, or the like, may send information to Parking Occupancy Server 130 via Network 105.

In some cases, Mobile Device 110 may be a handheld device or otherwise carried by a person. In some exemplary embodiments, Mobile Device 110 may detect a parking event in which the person is riding in a vehicle that enters or leaves a parking spot. Mobile Device 110 may detect the location of the parking spot by using a positioning device that is capable of ascertaining its position, such as, for example, a GPS receiver, Wi-Fi receivers, or the like. In some exemplary embodiments, Mobile Device 110 may comprise sensors, such as for example, accelerometers, useful for determining that the person is in a "driving" status (e.g., located within a vehicle that is being driven), in a "walking" status (e.g., not located within a moving vehicle) or the like. In some cases, the determination may be based on the pattern of movements identified by the accelerometer. However, other sensors may be utilized, such as a positioning device which can indicate speed, location over time, or the like.

In some exemplary embodiments, Mobile Device 110 may track movements of the person holding it, also referred to as a user. Mobile Device 110 may track a route of driving and detect when the user (or vehicle the user is riding) is searching for a parking spot. Mobile Device 110 may track an elapsed time during the search for parking spot which can be transferred to Parking Occupancy Server 130 as an indication on a level of parking occupancy in the region where the vehicle is driving, or at the destination of the user.

Additionally or alternatively, Mobile Device 110 may identify a destination of the user, which may or may not be far from an actual parking spot. The identification may be based on user input, such as input of a destination to a navigation system of Mobile Device 110 or of a counterpart component thereof. Additionally or alternatively, the identification may be automatic, such as based on the location of the user after the vehicle parks.

In some exemplary embodiments, Parking Occupancy Server 130 may receive information from additional sources, such as a Vehicle 120 (e.g., car, motorbike, bicycles, truck, or the like), Stationary devices (not shown) or the like. In some cases, paid parking lot information may be obtained from a stationary device at the parking lot which monitors parking occupancy within the paid parking lot. Additionally or alternatively, Vehicle 120 may provide information regarding its movement, including parking information. In some cases, changing transmission to "P" may be indicative of parking Vehicle. Additionally or alternatively, parking may be determined by Vehicle 120, when the driver steps out of the vehicle, when Vehicle 120 is locked, when the engine is shut down, or the like.

Figure 2A:
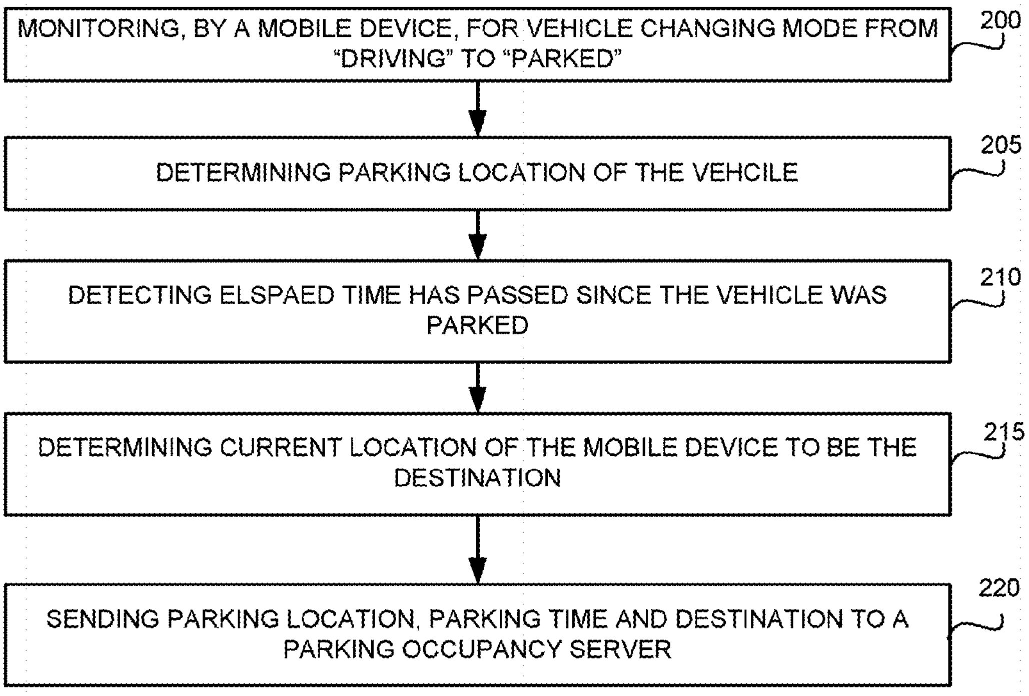
FIGS. 2A and 2B show flowchart diagrams of methods, in accordance with some exemplary embodiments of the disclosed subject matter.

It will be noted that the present illustration schematically shows a single Mobile Device 110. However, Computerized Environment 100 may comprise any number of mobile devices. Similarly, Computerized Environment 100 may connect to additional components Referring now to FIG. 2A showing a flowchart diagram of a method, in accordance with some exemplary embodiments of the disclosed subject matter. The method depicted in FIG. 2A may be performed by a mobile device, such as 110 of FIG. 1.

In Step 200, monitoring for a mode change from "driving" to "parked" may be performed. In some exemplary embodiments, a mobile device carried by a user may monitor for the mode change. In some cases, based on the movements of the mobile device, "driving" and "walking" modes may be determined. "parked" mode may be determined when switching between "driving" mode and "walking" mode. The monitoring may be performed without user input. In some exemplary embodiments, the monitoring may be performed without the use of positioning device, which may be useful in avoiding draining the battery of the mobile device.

In Step 205, a parking location of the vehicle may be determined. In some exemplary embodiments, a positioning device connected to or comprised by the mobile device may be used to determine the parking location. In some exemplary embodiments, the mobile device may be configured to invoke the positioning device in response to determining the "parked" mode, in response to determining a potential "parked" mode, or the like. In some exemplary embodiments, the parking time may also be determined and retained.

Additionally or alternatively, the user may manually indicate the parking location and parking time.

In Step 210, it may be detected that a predetermined time has passed since the vehicle was parked. The predetermined time may be, for example, ten minutes, fifteen minutes, or the like. The elapsed time may be sufficient time for the user to reach her destination and not too long as that the user will already leave the destination. However, the amount of time may be predetermined by system configuration. It will be sufficient that the amount of time will suit a majority of cases, 80% of cases, or the like.

After the predetermined time has passed, the current location of the mobile device carried by the user may be determined (Step 215). It may be assumed that the current location is the destination of the user carrying the mobile device. The information may be sent to parking occupancy server, such as 130 of FIG. 1 (Step 220). The information may include the parking location, the parking time and the destination. Additionally or alternatively, the information may include information derived from the above information, such as time of parking, destination, and a distance between the destination and the parking location.

In some exemplary embodiments, in case the mobile device is in a "driving" status during Step 215, the information may not be sent to the parking occupancy server out of an assumption that the user has reached her destination and left it. Additionally or alternatively, the mobile device may invoke a positioning device to determine speed of the mobile device during Step 215. If the speed is consistent with a user walking to her destination, a new timer may be set, such as for one minute, and when the time elapses, Step 215 may be performed again. In some cases, the mobile device may determine several locations of the mobile device within a predetermined time window, such as within a minute, to determine whether the user has reached her destination (and if so, determine her location using the mobile device (Step 215)) or is still walking towards her destination.

Figure 2B:
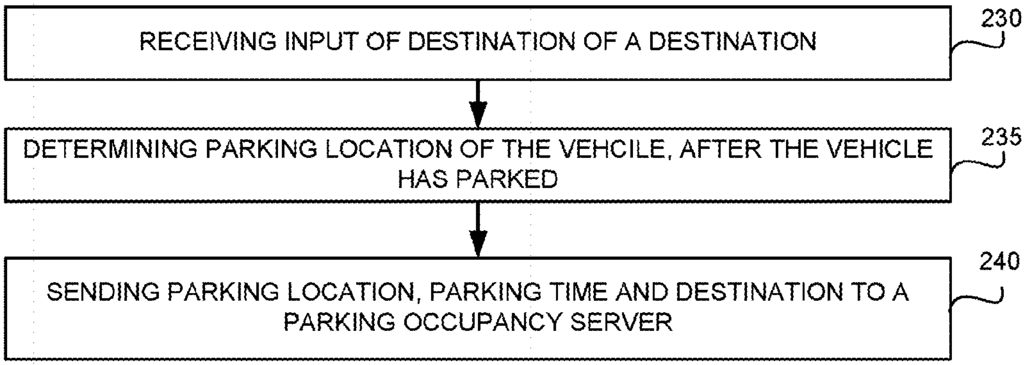

Referring now to FIG. 2B showing a flowchart diagram of a method, in accordance with some exemplary embodiments of the disclosed subject matter. The method depicted in FIG. 2B may be performed by a mobile device, such as 110 of FIG. 1, by a device permanently or semi-permanently attached to the vehicle, such as a navigation system of the vehicle, or the like.

In Step 230, an input from a user indicating a destination may be received. The user may enter the destination when using the mobile device and not in direct connection with the parking occupancy computation. As an example, the user may enter the destination information to a navigation system connected to or comprised by the mobile device. The information may be provided prior to the vehicle parking and potentially prior to the vehicle driving towards the destination.

After the user has entered the information, the user may drive the vehicle towards the destination and park the vehicle.

In Step 235, the parking location of the vehicle may be determined, after the vehicle has parked. It will be noted that the determination may be performed while the vehicle is being parked and still be considered as performed "after" the vehicle has parked. The location may be determined by a positioning device located in the vehicle (either mobile or non-mobile). In some cases, the location may be determined after an automatic determination that the vehicle has parked.

In Step 240, the parking information may be transmitted to the parking occupancy server.

Figure 3:
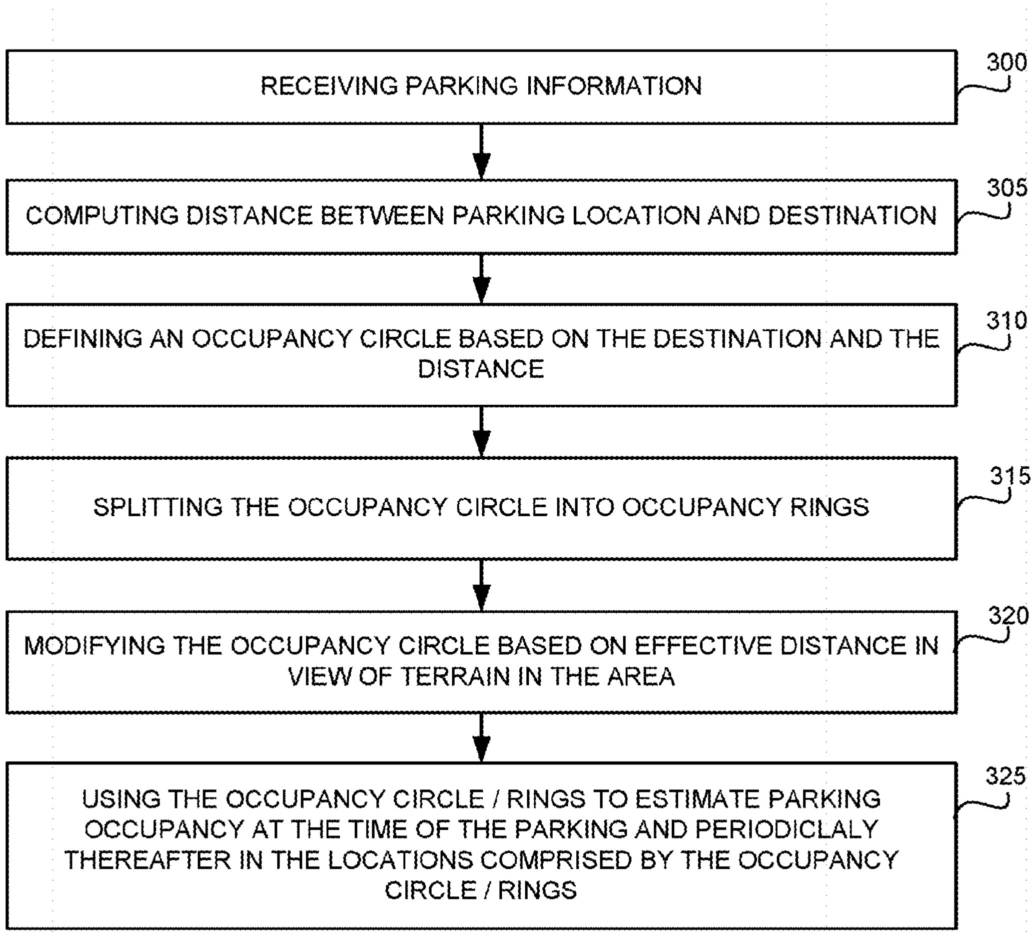
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. The method of FIG. 3 may be performed by a parking occupancy server, such as 130 of FIG. 1.

In Step 300, parking information is received. The parking information may include parking location, parking time and destination. The parking information may be received from a mobile device, such as 110 of FIG. 1, via a network, such as 105 of FIG. 1.

Figure 8A:
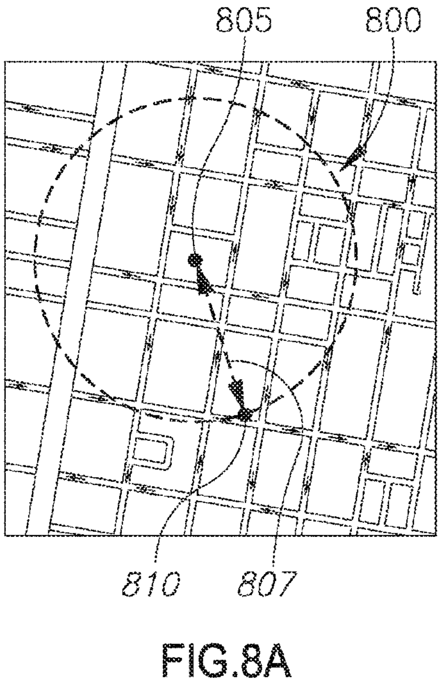
FIG. 8A-8G show schematic illustrations of occupancy circles, in accordance with some exemplary embodiments of the disclosed subject matter.

A distance between the parking location and the destination may be computed (Step 305). The distance may be used to define an occupancy circle (Step 310). The occupancy circle may be defined based on the destination as the center and the distance as a radius. In some cases, in case the distance is below a predetermined minimal threshold, the parking instance represented by the parking information may be filtered out and considered as not indicating of any parking occupancy near the destination. Referring to FIG. 8A, Occupancy Circle 800 is illustrated as on top of a schematic map. The center of Occupancy Circle 800 is Destination 805. The radius of Occupancy Circle 800 is Distance 807 which is the distance between Destination 805 and Parking Location 810.

Figure 8B:
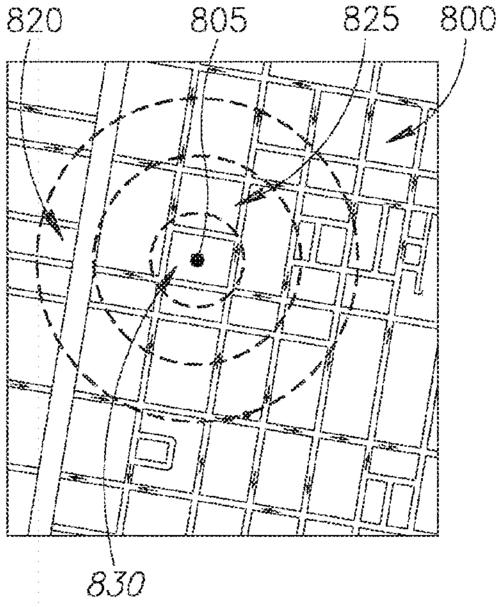

In Step 315, the occupancy circle may be divided into occupancy rings. A ring may be defined based on an internal radius and an external radius, where both radiuses are not greater than the radius of the occupancy circle. Each ring may be associated with a different parking occupancy level that is proportional to the distance from the center of the occupancy ring. Referring to an example depicted in FIG. 8B, in which Occupancy Circle 800 is divided into three rings: External Ring 820, Intermediate Ring 825, and Internal Ring 830. It will be noted, however, that the circle may be divided into any number of rings. In some cases, each ring may have a predetermined width (e.g., difference between internal radius and external radius) and the number of rings may depend on a radius of the occupancy circle. In some exemplary embodiments, each ring may be associated with a different occupancy level. The most internal ring (e.g., Ring 830) may the highest occupancy level which is deemed reduced when addressing a more external ring (e.g., Ring 825).

Figure 8C:
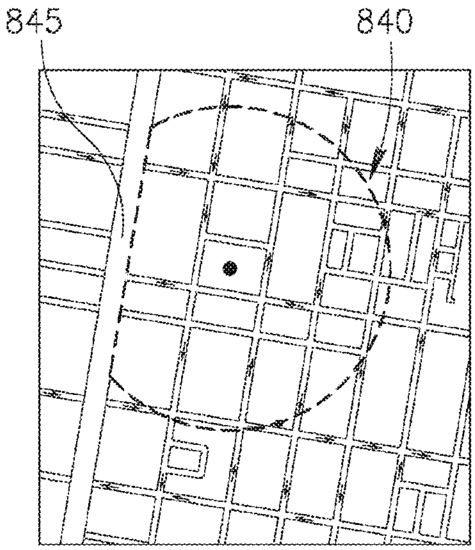

In Step 320, the occupancy circle may be modified. The occupancy circle may be modified based on terrain. As an example, some areas may be deemed as less potent for parking, such as due to their nature as industrial areas which people may tend to avoid, and may be removed from the occupancy circle. As another example, parking spots that to reach from them to the destination require crossing highways or similar impassible or substantially impassible obstacles, may be removed from the occupancy circle. Referring to FIG. 8C, Occupancy Circle 800 may be modified to a shape of a geometrically truncated circle in view of a Highway 840 to provide Occupancy Circle 840.

In some exemplary embodiments, the occupancy circle may be modified based on an effective distance. Instead of relating to an absolute distance and not relating to a terrain, the occupancy circle may be defined based on an effective distance which may be affected by the terrain. Some terrains may be deemed as harder to cross, and may be considered as having a longer effective distance than others. As an example, slopes or hills may have longer effective distance than a plain. As yet another example, residential neighborhood may have shorter effective distance than an industrial area.

Figure 8D:
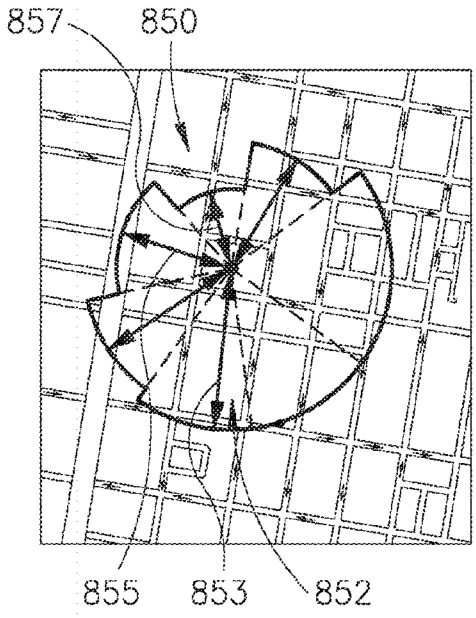

FIG. 8D exemplifies the use of effective distance in modifying an occupancy circle. Occupancy Circle 800 may be modified to Occupancy Circle 850 based on effective distance. Occupancy Circle 800 may be divided into sectors, such as Sector 852. Each sector may be modified based on the effective distance. In case the effective distance is longer, the radius of the sector may be reduced proportionally. For example, Radius 853 is larger than Radius 855, as the effective distance in the sector associated with Radius 855 is larger than that of Sector 852. Additionally or alternatively, each sector may be divided into rings and each ring may have a same effective width, so that some rings may have larger geometrical widths based on their terrain being easier to pass than the terrain of other rings which have smaller geometrical widths.

Figure 8E:
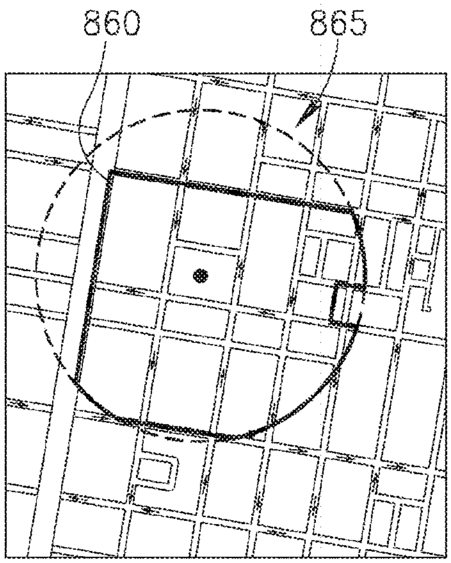

FIG. 8E also exemplifies modification of an occupancy circle based on a terrain. Occupancy Circle 800 may be modified to Occupancy Circle 860 based on the terrain comprised by Geometrical Circle 865. Some areas may be considered as areas in which there are no parking spaces, in which a person will not park due to his or her preferences, or the like. Those areas may be removed from Geometrical Circle 865. In some cases, Occupancy Circle 860 may have the geometrical shape of a polygon that is substantially defined by Geometrical Circle 865. In some cases, the polygon may be comprised by the Geometrical Circle 865, may comprise Geometrical Circle 865, or the like. In some exemplary embodiments, Occupancy Circle 860 may be a polygon loosely adhering to the shape of Geometrical Circle 865.

In Step 325, the occupancy circle and/or the occupancy rings may be used to estimate parking occupancy at the time of the parking instance. As an example, parking spots within a ring may be considered to have a parking occupancy level of the ring. In some exemplary embodiments, several occupancy circles that comprise the parking spot may be used to interpolate an estimated parking occupancy. In some cases, the information provided by the parking occupancy circle is deemed relevant in real-time to a predetermined amount of time, such as 15 minutes, 30 minutes, or the like. Additionally or alternatively, the information provided by the parking occupancy may be used to predict parking occupancy at similar times, such as at the same time of day, at the same time in the same day of the week, at the same time in the same day of the month, at the same time in the same day of the year, or the like.

Figure 4:
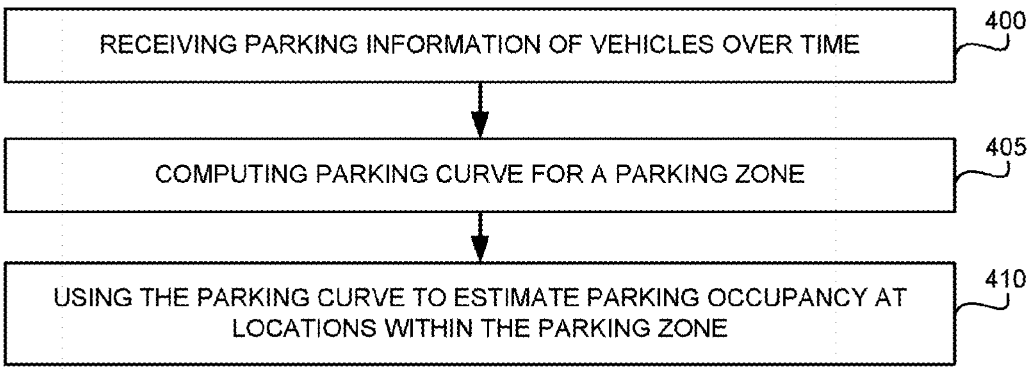
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter. The method of FIG. 4 may be performed by a parking occupancy server, such as 130 of FIG. 1.

In Step 400, parking information may be received from vehicles over time. The parking information may include the parking spot where the vehicle has parked. The parking information may include a parking start time (e.g., a time in which the vehicle has parked in the parking spot). The parking information may include a parking end time (e.g., a time in which the vehicle has vacated the parking spot). Additionally or alternatively, the parking information may include a parking duration (e.g., a time difference between the parking start time and parking end time). In some exemplary embodiments, vehicles may transmit the information or alternative the parking information may be received from a device, such as Mobile Device 110.

The parking information may be received from a sample of the population of vehicles that make park in the parking zone which is to be analyzed for parking occupancy.

In Step 405, a parking curve may be computed for the parking zone. The curve may indicate a number of occupied parking spots as a function of a time. The time may be, for example, a time of day, a time of the week, or the like. The time may be indicated in time units, such as of one minute, of 15 minutes, of an hour, or the like. As an example, in case the parking information indicate one parking instance starting from 15:00 and ending at 17:00, another parking instance starting at 14:00 and ending at 16:00, and another parking instance starting at 15:30 and ending at 18:00, the parking curve may indicate a value of one between 14:00-15:00, a value of two at 15:00-15:30, a value of three at 15:30-16:00, a value of two at 16:00-17:00, a value of one at 17:00-18:00 and a value of zero after 18:00. The parking curve may indicate a number of occupied parking spots at the parking zone in a specified time. The parking curve may be a histogram graph, a continuous curve, or the like. In some exemplary embodiments, a value of a parking curve may be indicative of a parking occupancy at the parking zone at the same time and the possibility to find a parking spot may be in proportion to the value of the value of the parking curve.

In some exemplary embodiments, the parking curve may be normalized. A maximal value of the parking curve may be indicative of a total number of parking spots in the parking zone. A normalized parking curve may be indicative of an estimated percentage of the parking spots that are occupied in the parking zone.

In some exemplary embodiments, the parking curve may be generated based on values gathered over time. The value of the curve at a specified time of day may be the average value measured in the time of day. As an example, if in a first day at 14:00-14:15 the value is 22, in a second day at the same timeframe the value is 24, in a third day the value is 24, then the value in the curve may be 23.33. Additionally or alternatively, the value may be a median, an average, or a similar value computed based on the series of measured values.

In Step 410, the parking curve may be used to estimate parking occupancy at the parking zone or any location within the parking zone. In some exemplary embodiments, the value according to the parking curve at a target time may be used to estimate the parking occupancy in the parking zone at the target time.

Figure 5:
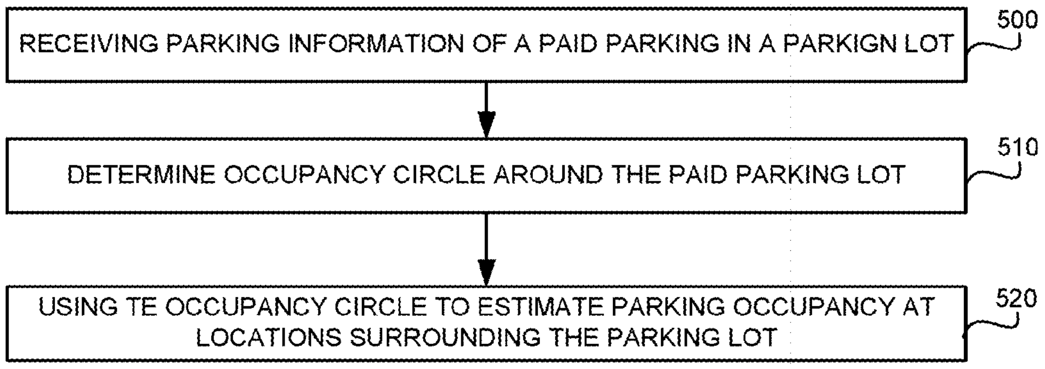
FIG. 5 shows a flowchart diagram of a method, in accordance with some exemplary embodiments of the disclosed subject matter.

Referring now to FIG. 5 showing a flowchart diagram of a method, in accordance with some exemplary embodiments of the disclosed subject matter. The method of FIG. 5 may be performed by a parking occupancy server, such as 130 of FIG. 1.

In Step 500, parking information relating to paid parking in paid parking lots may be obtained. The information may be obtained from any source, such as but not limited to the mobile devices, such as 110 of FIG. 1, monitoring systems of the parking lots, such as used to monitor a number of used parking spots within the parking lot and prevent entrance when the parking lot is full, or the like. In some exemplary embodiments, the information may indicate a time of parking and a parking location. The parking location may be the parking spot within the parking lot or a location of the parking lot itself.

In Step 510, an occupancy circle may be determined based on the parking information. The occupancy circle may be determined around the location of the paid parking at the time of parking. Intuitively, the fact that the user prefers using a paid parking lot to finding an on-street parking, may be indicative of parking occupancy around the paid parking lot. The radius of the occupancy circle may be determined based on a predetermined radius, based on cost of parking at the paid parking lot, or the like. In some exemplary embodiments, the radius may be different for different users who have difference utilities. As an example, a user who is more likely to pay for parking may be associated with a smaller radius than a user who would rather avoid paid parking lots and use free parking instead. In some exemplary embodiments, the utility may be associated with an estimated cost of time of the user (e.g., a user who values her hour at 100 USD would be associated with a shorter radius than a user who values his hour at 70 USD).

The occupancy circle determined in Step 510 may be divided into occupancy rings, may be modified based on effective distance, based on terrain, or the like, in a similar manner to that depicted in Steps 315, 320 of FIG. 3.

In Step 520, the occupancy circle may be used to estimate parking occupancy.

Figure 8F:
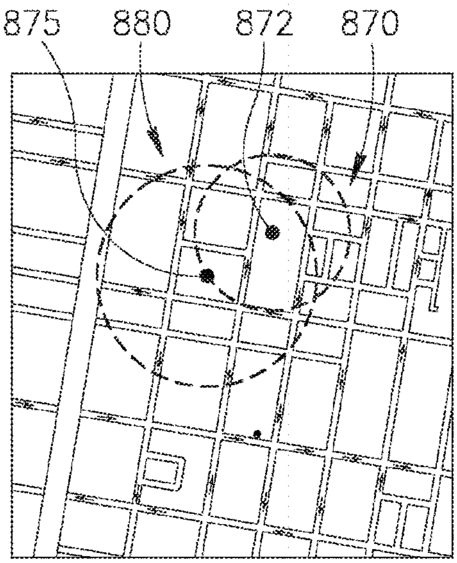

Occupancy Circle 870 of FIG. 8F may be defined based on a Destination 872 and a Parking Location 875. In case Parking Location 875 is within a paid parking lot, Occupancy Circle 875 may also be defined based on the same parking instance.

Figure 6:
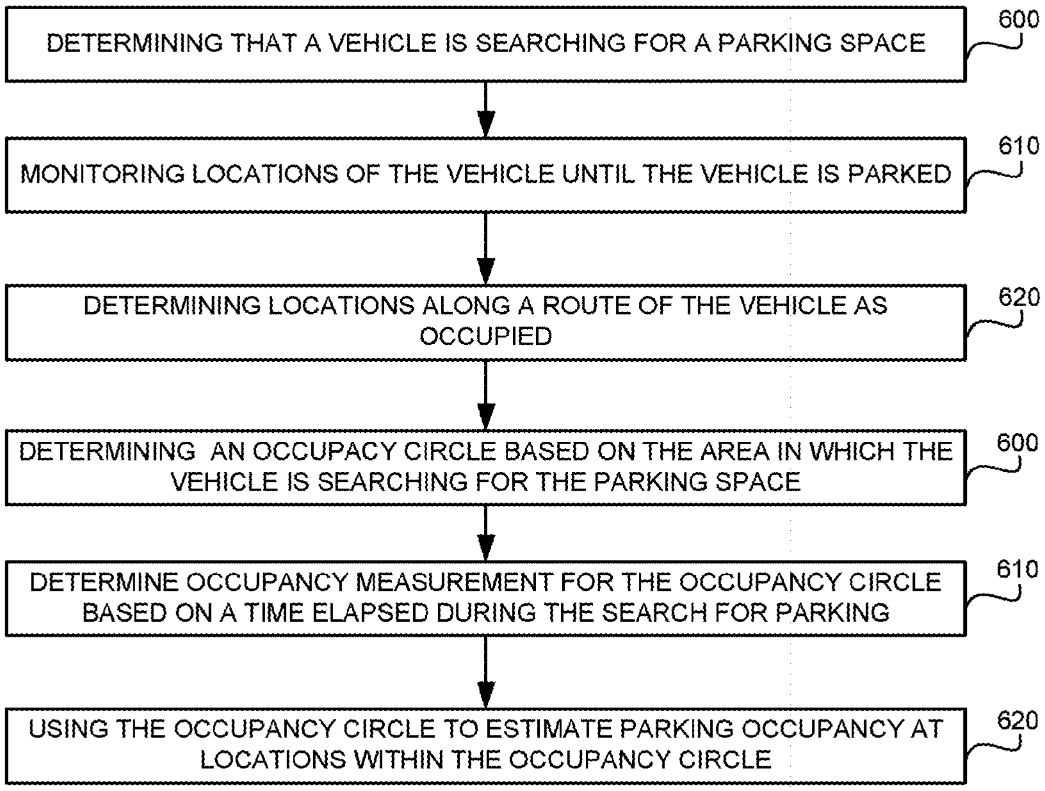
FIG. 6 shows a flowchart diagram of a method, in accordance with some exemplary embodiments of the disclosed subject matter.

Referring now to FIG. 6 showing a flowchart diagram of a method, in accordance with some exemplary embodiments of the disclosed subject matter. The method of FIG. 6 may be performed by a parking occupancy server, such as 130 of FIG. 1, by a mobile device, such as 110, a combination thereof, or similar components.

In Step 600, it may be determined that a vehicle is searching for a parking space. The determination may be automatic or based on user input. In some exemplary embodiments, the automatic determination may be based on information monitored and obtained by a mobile device carried by a user in the vehicle, by a positioning device, or the like. The automatic information may be based on the vehicle arriving to a destination and not stopping at the destination. Additionally or alternatively, the determination may be based on the vehicle passing through a same location more than once over a relatively short time, such as within 15 minutes. Additionally or alternatively, the determination may be based on the vehicle continuing the move within a vicinity of a destination over a relatively short period of time, such as 15 minutes. In case the vehicle's movements are consistent with a vehicle searching for a parking space (e.g., driving in the same area, driving in a reduced speed, entering side streets, driving through parallel streets back and forth, or the like), the determination may be performed. In some cases, the determination may not require a prior knowledge of the destination, which may be determined based on the movements of the vehicle, or after the vehicle parks and the user reached her destination (e.g., Step 215 of FIG. 2).

In response to the determination, in Step 610, the locations of the vehicle may be monitored until the vehicle is parked. The locations of the vehicle may be monitored by a positioning device, such as comprised by a mobile device carried by the user or embedded in the vehicle.

In Step 620, any parking spot along the route of the vehicle may be determined to be occupied or at a high likelihood of being occupied. Such determination may be based on the intuition that if there was a vacant parking spot it is of high likelihood that the vehicle would have used that parking spot. The determination may be relevant for the time in which the vehicle has passed by the parking spot. In some exemplary embodiments, such information may be deemed relevant for a period of time thereafter, such as 15 minutes, an hour or the like. In some cases, the information may be considered decaying in an exponent or linear manner over time.

In Step 630, an occupancy circle may be determined based on the monitored movements of the vehicle. The occupancy circle may be defined based on a destination of the user, which may be known beforehand or determined thereafter. Additionally or alternatively, the center may be an estimated destination, such as a center of an area in which the vehicle is searching for a parking spot. Additionally or alternatively, the destination may be a mass center of the vehicle's monitored locations. In some exemplary embodiments, the mass center may be modified based on terrain. As an example, assume that the destination is along a beach. As it is impossible for the vehicle to search for a parking spot in the water, though the destination is along the water, the center mass may be farther away from the coast line. In case the terrain is known, impassible terrain may be referred to when computing the estimated destination. As an example, in case the vehicle is found near an impassible terrain, the impassible terrain may be used as a mirror to duplicate some or all of the monitored locations when computing the estimated target destination.

The occupancy circle may be defined based on the destination and locations in which the vehicle was monitored. In some exemplary embodiments, the radius may be determined based on the distance between the destination and the most distance location in which the vehicle searched for parking. Additionally or alternatively, the 90% most distant location may be used, or a similar percentile.

In Step 640, an occupancy measurement for the occupancy circle may be determined. The occupancy measurement may be based on time elapsed during the search for parking. In more condensed areas, the search for parking may take more time and this may indicate higher parking occupancy near the destination.

The occupancy circle may be split into occupancy rings, may be modified based on effective distance, based on terrain, or the like.

In Step 650, the occupancy circle may be used to estimate parking occupancy.

In some exemplary embodiments, search for parking below a predetermined minimal threshold, such as below one minute, below 90 seconds, or the like, may not be used for estimating parking occupancy. Additionally or alternatively, such parking instances may be indicative of low parking occupancy and may not be used as a basis for a parking occupancy circle.

Figure 7:
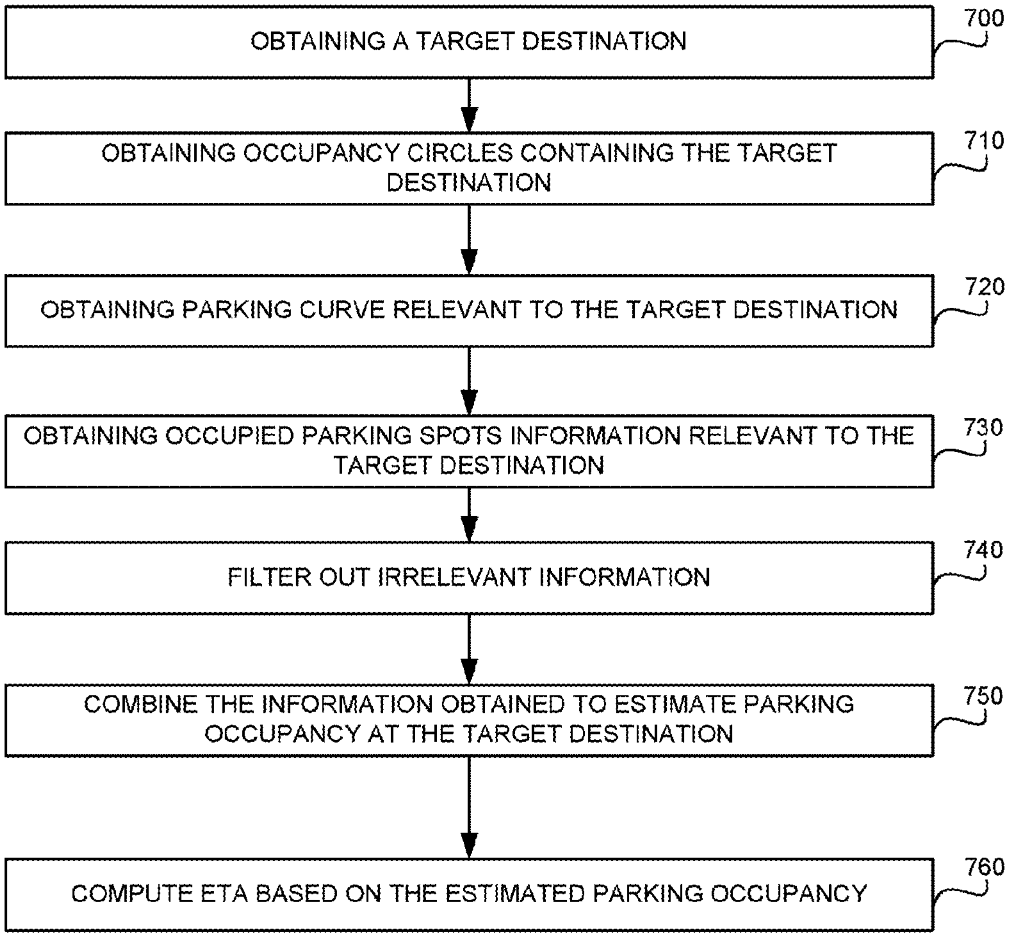
FIG. 7 shows a flowchart diagram of a method, in accordance with some exemplary embodiments of the disclosed subject matter.

Referring now to FIG. 7 showing a flowchart diagram of a method, in accordance with some exemplary embodiments of the disclosed subject matter. The method of FIG. 7 may be performed by a parking occupancy server, such as 130 of FIG. 1. Additionally or alternatively, the method may be performed by a client device, such as Mobile Device 110 of FIG. 1.

In Step 700, a target destination may be obtained. The target destination may be obtained as part of a query by a user to determine parking occupancy in a parking zone, near an address, in a street, or the like. Additionally or alternatively, the target destination may be automatically determined, for example as part of an offline computation of parking occupancy within a neighborhood, city, state, or the like. During an offline computation, all parking locations within a designated area may be processed iteratively and during each iteration Step 700 may obtain a different destination.

In some exemplary embodiments, additionally to the target destination, a target time for which the parking occupancy estimation is desired may be obtained, such as 7:15 on Monday, 10:00 on the first Sunday of the month, or the like. Additionally or alternatively, the query may be a real-time query relating to the current parking occupancy in the target destination. In such a case, the target time may be the current time.

In Step 710, occupancy circles may be obtained. The obtained occupancy circles may be occupancy circles that include the target destination. The occupancy circles may be occupancy circles based on paid parking lot parking instance, based on movements during parking search, based on distance between destination and the parking spot, or the like.

In Step 720, a parking curve may be obtained. The parking curve may be a parking curve that is relevant to the target destination, such as parking curve that refers to a parking zone in which the target destination is located, parking curve that refers exactly to the target destination, or the like.

In Step 730, occupied parking spots information may be obtained. The occupied parking spots may be information obtained from tracking movements of vehicles while searching for parking. The occupied parking spots information may be information that is relevant for the target time, such as information gathered within a predetermined window prior to the target time, such as 15 minutes prior to the target time, 30 minutes prior to the target time, or the like.

In Step 740, irrelevant information may be filtered out to be ignored. Additionally or alternatively, the irrelevant information may not be obtained in the first place. In some exemplary embodiments, the information of Steps 710-730 may be obtained from a database retaining information obtained over time from a plurality of users using a plurality of vehicles. The database may or may not retain irrelevant information. In some exemplary embodiments, the relevancy of the information may be based on the time of the information, such as the same as the target time (or within a predetermined range therefrom).

In some exemplary embodiments, relevancy may also be based on user's behavior. In some cases, a user may park her vehicle at the same parking spot due to her owning the parking spot. Hence, parking instances by the user at the parking spot may not be used for estimating parking occupancy near the parking spot. However, parking instances at different locations may still be used. Additionally or alternatively, parking information obtained from users while using public transportation may be filtered out as the fact that a bus stops and the user exits the bus does not necessarily mean that the bus has actually parked. Moreover, the parking spot may be predetermined and not indicative of parking occupancy in its vicinity. Additionally or alternatively, parking instances near a train station or near any other public transportation that provides parking spots may be filtered out or taken into account differently than other parking instances.

In Step 750, all gathered information may be combined to provide an estimated parking occupancy at the target destination.

In Step 760, based on the estimated parking occupancy, an Estimated Time of Arrival (ETA) to the target destination from a current location may be computed. The ETA may be computed by computing an estimated driving time from the current location to the target destination and by adding an estimated searching for parking time. The estimated driving time may be computed based on an estimated or user-selected driving route. The estimated driving time may take into account traffic information, such as information as to traffic jams, mean time of waiting in a junction, maximal speed in a road or average driving speed in the road, or the like. The estimated searching for parking time may be an estimated time until finding a parking spot near the target destination. Additionally or alternatively, the estimated searching for parking time may be an estimated time until finding a parking spot near the target destination and walking from the parking spot to the target destination. In some exemplary embodiments, the estimated searching for parking time may be based on relevant historic parking instances of the user for who the ETA is computed, of users similar to the user (e.g., by demographic parameters, by driving behavior, by parking behavior, or the like), or of all users. Additionally or alternatively, the relevant historic parking instances may be parking instances in which a parking spot was found in a vicinity of the target destination, such as within an absolute distance below a predetermined threshold (e.g., five hundred meters, two kilometers, or the like), within an effective distance below a predetermined threshold, or the like. Additionally or alternatively, a parking instance in which the target destination was in a vicinity of the target destination (e.g., within two hundred meters, within five hundred meters, within one kilometer, or the like) may be deemed as relevant regardless of the distance of the parking spot found to the target destination. In some exemplary embodiments, the estimated searching for parking time may be an average parking time measured in relevant historic parking instances. Additionally or alternatively, the estimated parking time may be an average time measured until a parking spot was found in relevant historic parking instances to which an estimated walking time is added. The estimated walking time may be an estimated walking time of the effective distance of an average occupancy circle computed for the target destination based on relevant historic parking instances. In some exemplary embodiments, the ETA may be a duration of time, such as 45 minutes, 60 seconds, or the like. Additionally or alternatively, the ETA may be a time (e.g., 16:45, 16:45:30, or the like) that is computed by adding the duration of time to a current time.

Figure 8G:
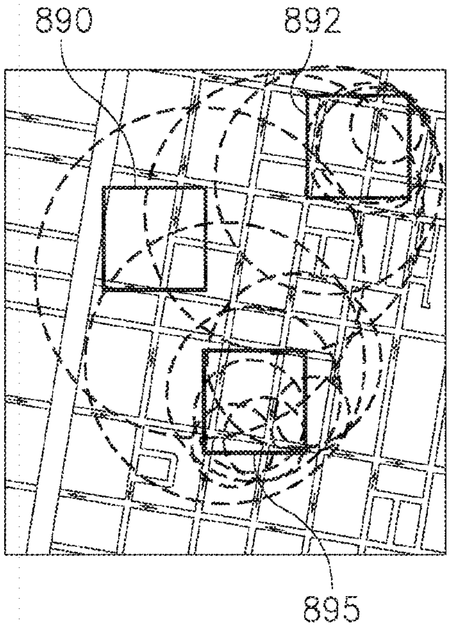

FIG. 8G provides a schematic illustration of aggregating several occupancy circles to provide parking occupancy. Target Destination 890 can be determined to have higher parking occupancy than Destinations 892 and 895. In Target Destination 890 there are almost no near-by parking instances as opposed to Destinations 892 and 895. It can also be noted that small occupancy circles are defined near Destinations 895 which may be caused by parking instances that are associated with destination within Destination 895 which was satisfied by a parking instance near-by.

It will be noted that the parking occupancy circles of FIG. 8G may be defined based on different information types, such as parking instances in paid parking lots, vehicle navigation while searching for parking, parking instances and associated destinations, or the like. The occupancy circles may be overlaid and the parking occupancy level defined by the circles (or rings) may be accumulated or otherwise aggregated, to compute the estimated parking occupancy.

Figure 9:
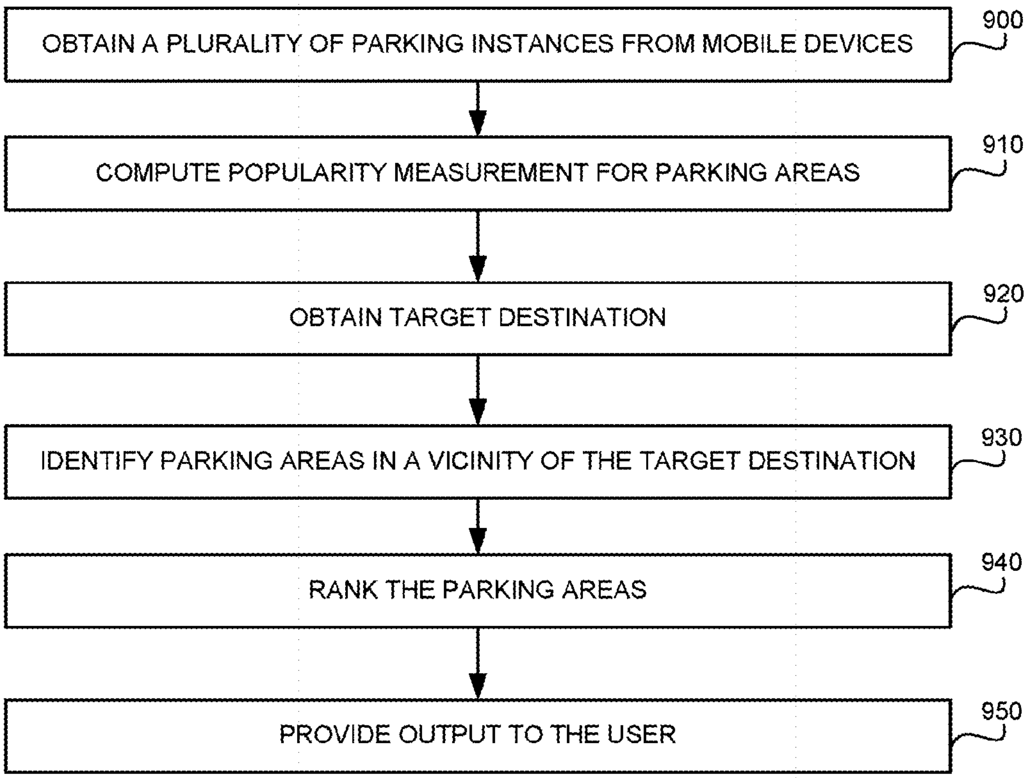
FIG. 9 shows a flowchart diagram of a method, in accordance with some exemplary embodiments of the disclosed subject matter.

Referring now to FIG. 9 showing a flowchart diagram of a method, in accordance with some exemplary embodiments of the disclosed subject matter. The method of FIG. 9 may be performed by a parking occupancy server, such as 130 of FIG. 1. Additionally or alternatively, the method may be performed by a client device, such as Mobile Device 110 of FIG. 1.

In Step 900, a plurality of parking instances may be obtained. The parking instances may be obtained from mobile devices of users. The parking instances may be obtained over time. In some exemplary embodiments, each parking instance may indicate at least a parking location and a parking time. In some exemplary embodiments, the plurality of parking instances may be crowd sourced to be used to infer information from the wisdom of the crowds.

In Step 910, popularity measurements may be computed for parking areas. The popularity measurement may be computed for a target time, such as a current time, a user-inputted time of a day, time of a week, or the like. Additionally or alternatively, the popularity measurement may be computed for all time units. The plurality measurements may reflect a ranking of parking areas as perceived by the wisdom of the crowds. In some exemplary embodiments, ranking of parking areas may be based on a popularity measurement of each parking area at a parking time according to the parking instances. A more popular parking area may be perceived as a preferred parking area and may be ranked in a higher ranking than a less popular parking area. For example, assuming that at the time window between 16:00 and 16:15, there are 200 parking instances at parking area A, 170 parking instances at parking area B, and 20 parking instances at parking area C, then parking area A may be ranked higher than parking area B which may be ranked higher than parking area C.

In some exemplary embodiments, Step 910 may be performed in an offline manner and its output be retained in a database to be retrieved on demand. Additionally or alternatively, Step 910 may be performed on demand.

In Step 920, a target destination may be obtained from the user. The target destination may be provided explicitly or implicitly. Additionally or alternatively, a target time may be obtained from the user, either explicitly or implicitly. In some exemplary embodiments, the target time may be computed based on an ETA to the target destination.

In Step 930, parking areas in a vicinity of the target destination may be determined. In some exemplary embodiments, the parking areas may be parking areas within a predetermined distance from the target destination, within a predetermined effective distance from the target destination, or the like. In some exemplary embodiments, the parking areas may be inferred from the plurality of parking instances. The parking areas may be parking areas for which users have parked in the past when reaching the target destination or a destination in its vicinity.

In Step 940, the parking areas of Step 930 may be ranked based on the popularity measurements of Step 910. In some exemplary embodiments, in Step 910 a popularity measurement may be computed and in Step 940 a ranking may be performed to a subset of the parking areas based on the popularity measurement.

In Step 950, the user may be provided with an output based on the ranking of Step 940. In some exemplary embodiments, the output may comprise providing the user directions towards a top-ranked parking area. In some exemplary embodiments, the user may be using a navigation system to navigate to the target destination. The navigation system may direct the user to the top-ranked parking area to allow the user to find a parking spot. Additionally or alternatively, the output may be a list of the parking areas ordered based on the ranking. Additionally or alternatively, the list may include a portion of the parking areas, such as top 10%, top five parking areas, or the like.

In some exemplary embodiments, the method of FIG. 9 may be performed without user input. Additionally or alternatively, the method of FIG. 9 may be performed so as to rank all parking areas, without focusing on a target destination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method comprising:
obtaining a parking location and a destination;
computing, by a processor, a distance between the parking location and the destination;
determining, by the processor, a parking occupancy based on the distance, wherein said determining the parking occupancy comprises:
determining an occupancy circle that is defined by a center and a radius, wherein the center is the destination, wherein the radius is the distance between the parking location and the destination; and
with respect to a target location that is comprised by the occupancy circle, determining the parking occupancy for the target location based on a distance between the center and the target location; and
outputting the parking occupancy.

2. The computer-implemented method of claim 1, wherein said determining the parking occupancy comprises:
splitting the occupancy circle to a plurality of rings, wherein each ring is associated with a different parking occupancy level; and
determining the parking occupancy based on the parking occupancy level of a ring in which the target location is comprised.

3. The computer-implemented method of claim 1, wherein said determining the parking occupancy comprises:
obtaining a plurality of occupancy circles in which the target location is comprised, wherein the plurality of occupancy circles comprises the occupancy circle; and
determining the parking occupancy based on an aggregation of the plurality of occupancy circles.

4. A computer-implemented method comprising:
obtaining a parking location and a destination;
computing, by a processor, a distance between the parking location and the destination;
determining, by the processor, a parking occupancy based on the distance, wherein said determining the parking occupancy comprises:
determining an occupancy circle that is loosely defined by a center and a radius, wherein the center is the destination, wherein the radius is the distance between the parking location and the destination, wherein the occupancy circle is defined based on an effective distance from the center based on a terrain structure; and
with respect to a target location that is comprised by the occupancy circle, determining the parking occupancy for the target location based on a distance between the center and the target location.

5. The computer-implemented method of claim 4, wherein the effective distance is based on at least one of the following:
the terrain comprising slopes;
the terrain comprising highways;
the terrain comprising industrial area.

6. A computer-implemented method comprising:
obtaining a parking location and a destination, wherein the parking location is determined by a positioning device in response to an automatic determination that a vehicle is parked;
computing, by a processor, a distance between the parking location and the destination;
determining, by the processor, a parking occupancy based on the distance;
and
outputting the parking occupancy.

7. The computer-implemented method of claim 6, wherein the parking location is associated with a time, wherein the parking occupancy is associated with the time.

8. A computer-implemented method comprising:
obtaining a parking location and a destination, wherein the destination is automatically determined by a positioning device after a predetermined time has elapsed after a vehicle was parked;
computing, by a processor, a distance between the parking location and the destination;
determining, by the processor, a parking occupancy based on the distance;
and
outputting the parking occupancy.

9. A computer-implemented method comprising:
obtaining a parking location and a destination, wherein the destination is determined based on user input prior to parking, wherein the parking location is determined after parking;
computing, by a processor, a distance between the parking location and the destination;
determining, by the processor, a parking occupancy based on the distance;
and
outputting the parking occupancy.

10. A computer-implemented method comprising:
obtaining a parking location and a destination;
computing, by a processor, a distance between the parking location and the destination;
obtaining a parking curve indicative of number of used parking spots at a parking zone at different times, wherein the parking curve is defined based on a parking usage dataset which comprises a plurality of records, wherein each record comprises a parking spot location, a parking start time, and a parking end time, wherein the parking usage dataset is a sample of the usage of parking spots by vehicles parking at the parking zone;

determining, by the processor, a parking occupancy of a target location based on a combination of the distance and the parking curve; and outputting the parking occupancy.

11. A computer-implemented method comprising:

obtaining a location of a paid parking lot and a time of parking in the paid parking lot;

obtaining a target location for which parking occupancy is to be computed;

computing, by a processor, a distance between the target location and the location of the paid parking lot;

determining, by the processor, a parking occupancy based on the distance, wherein the parking occupancy is proportional to the distance, whereby a parking instance in the paid parking lot is used to estimate parking occupancy outside the paid parking lot; and outputting the parking occupancy.

12. The computer-implemented method of claim 11, wherein said determining the parking occupancy comprises:

determining a parking lot occupancy circle that is defined by a center and a radius, wherein the center is the location of the paid parking lot, wherein the radius is a predetermined radius; and with respect to the target location that is comprised by the occupancy circle, determining the parking occupancy for the target location based on a distance between the center and the target location.

13. A computer-implemented method comprising:

determining that a vehicle that is driving is searching for a parking space;

tracking a route of the vehicle while searching for the parking space;

determining, by a processor, a parking occupancy for a target location based on the route of the vehicle, wherein said determining the parking occupancy comprises:

determining that the target location is occupied based on the route passing the target location; and outputting the parking occupancy.

14. The computer-implemented method of claim 13, wherein said determining that the vehicle is searching for a parking space comprises:

determining, by a positioning device, locations of the vehicle at different times; and based on the locations, identifying that the vehicle has passed through a same location twice within a predetermined timeframe, wherein the predetermined timeframe is shorter than an hour.

15. The computer-implemented method of claim 13, wherein said determining that the vehicle is searching for a parking space comprises:

determining, by a positioning device, locations of the vehicle at different times; and based on the locations, identifying that the vehicle is approximated as circling a target location within a predetermined timeframe, wherein the predetermined timeframe is shorter than an hour.

16. A computer-implemented method comprising:

determining that a vehicle that is driving is searching for a parking space;

tracking a route of the vehicle while searching for the parking space;

determining, by a processor, a parking occupancy for a target location based on the route of the vehicle, wherein said determining the parking occupancy comprises:

determining an occupancy circle in which the route of the vehicle has passed, wherein a center of the occupancy circle is a destination of the vehicle; and wherein the parking occupancy within the occupancy circle is defined based on a time elapsed while the searching for the parking space; and outputting the parking occupancy.

17. A computer-implemented method comprising:

obtaining from a plurality of mobile devices of users, a plurality of parking instances, wherein each parking instance comprises a parking location and a parking time;

receiving from a user a target destination or indication thereof;

ranking, by a processor, a set of parking areas at a target time, wherein the set of parking areas are parking areas in a vicinity of the target destination, wherein the set of parking areas are parking areas that are within a predetermined radius of the target destination, wherein said ranking comprises: computing a popularity measurement of each parking area at the target time based on the plurality of parking instances; and outputting an indication to a user of said ranking.

18. A computer-implemented method comprising:

obtaining from a plurality of mobile devices of users, a plurality of parking instances, wherein each parking instance comprises a parking location and a parking time;

receiving from a user a target destination or indication thereof;

ranking, by a processor, a set of parking areas at a target time, wherein the set of parking areas are parking areas in a vicinity of the target destination, wherein the set of parking areas are parking areas that are within a predetermined effective distance of the target destination, wherein said ranking comprises: computing a popularity measurement of each parking area at the target time based on the plurality of parking instances; and outputting an indication to a user of said ranking.

19. The computer-implemented method of claim 18 further comprising:

receiving from a user a target destination or indication thereof; and wherein the set of parking areas are parking areas in a vicinity of the target destination.

20. The computer-implemented method of claim 19, wherein said outputting comprises providing to the user directions towards a top-ranked parking area.

21. A computer program product comprising a computer readable storage medium retaining program instructions, which program instructions when read by a processor, cause the processor to perform a method comprising:

obtaining a parking location and a destination;

computing a distance between the parking location and the destination;

determining a parking occupancy based on the distance, wherein said determining the parking occupancy comprises:

determining an occupancy circle that is defined by a center and a radius, wherein the center is the destination, wherein the radius is the distance between the parking location and the destination; and with respect to a target location that is comprised by the occupancy circle, determining the parking occupancy for the target location based on a distance between the center and the target location; and outputting the parking occupancy.

22. The computer program product of claim 21, wherein said determining the parking occupancy comprises:

splitting the occupancy circle to a plurality of rings, wherein each ring is associated with a different parking occupancy level; and determining the parking occupancy based on the parking occupancy level of a ring in which the target location is comprised.

23. The computer program product of claim 21, wherein said determining the parking occupancy comprises:

obtaining a plurality of occupancy circles in which the target location is comprised, wherein the plurality of occupancy circles comprises the occupancy circle; and determining the parking occupancy based on an aggregation of the plurality of occupancy circles.

24. A computerized apparatus having a processor and a memory, the processor being adapted to perform the steps of:

obtaining a parking location and a destination;

computing a distance between the parking location and the destination;

determining a parking occupancy based on the distance, wherein said determining the parking occupancy comprises:

determining an occupancy circle that is defined by a center and a radius, wherein the center is the destination, wherein the radius is the distance between the parking location and the destination; and with respect to a target location that is comprised by the occupancy circle, determining the parking occupancy for the target location based on a distance between the center and the target location; and outputting the parking occupancy.

25. The computerized apparatus of claim 24, wherein said determining the parking occupancy comprises:

splitting the occupancy circle to a plurality of rings, wherein each ring is associated with a different parking occupancy level; and determining the parking occupancy based on the parking occupancy level of a ring in which the target location is comprised.

26. The computerized apparatus of claim 24, wherein said determining the parking occupancy comprises:

obtaining a plurality of occupancy circles in which the target location is comprised, wherein the plurality of occupancy circles comprises the occupancy circle; and determining the parking occupancy based on an aggregation of the plurality of occupancy circles.

27. A computer program product comprising a computer readable storage medium retaining program instructions, which program instructions when read by a processor, cause the processor to perform a method comprising:

obtaining a parking location and a destination;

computing a distance between the parking location and the destination;

determining a parking occupancy based on the distance, wherein said determining the parking occupancy comprises:

determining an occupancy circle that is loosely defined by a center and a radius, wherein the center is the destination, wherein the radius is the distance between the parking location and the destination, wherein the occupancy circle is defined based on an effective distance from the center based on a terrain structure; and with respect to a target location that is comprised by the occupancy circle, determining the parking occupancy for the target location based on a distance between the center and the target location.

28. The computer program product of claim 27, wherein the effective distance is based on at least one of the following:

the terrain comprising slopes;

the terrain comprising highways;

the terrain comprising industrial area.

29. A computerized apparatus having a processor and a memory, the processor being adapted to perform the steps of:

obtaining a parking location and a destination;

computing a distance between the parking location and the destination;

determining a parking occupancy based on the distance, wherein said determining the parking occupancy comprises:

determining an occupancy circle that is loosely defined by a center and a radius, wherein the center is the destination, wherein the radius is the distance between the parking location and the destination, wherein the occupancy circle is defined based on an effective distance from the center based on a terrain structure; and with respect to a target location that is comprised by the occupancy circle, determining the parking occupancy for the target location based on a distance between the center and the target location.

30. The computerized apparatus of claim 29, wherein the effective distance is based on at least one of the following:

the terrain comprising slopes;

the terrain comprising highways;

the terrain comprising industrial area.

31. A computer program product comprising a computer readable storage medium retaining program instructions, which program instructions when read by a processor, cause the processor to perform a method comprising:

obtaining a parking location and a destination, wherein the parking location is determined by a positioning device in response to an automatic determination that a vehicle is parked;

computing a distance between the parking location and the destination;

determining a parking occupancy based on the distance; and outputting the parking occupancy.

32. A computerized apparatus having a processor and a memory, the processor being adapted to perform the steps of:

obtaining a parking location and a destination, wherein the parking location is determined by a positioning device in response to an automatic determination that a vehicle is parked;

computing a distance between the parking location and the destination;

determining a parking occupancy based on the distance; and outputting the parking occupancy.

33. A computer program product comprising a computer readable storage medium retaining program instructions, which program instructions when read by a processor, cause the processor to perform a method comprising:

obtaining a parking location and a destination, wherein the destination is automatically determined by a positioning device after a predetermined time has elapsed after a vehicle was parked;

computing a distance between the parking location and the destination;

determining a parking occupancy based on the distance; and outputting the parking occupancy.

34. A computerized apparatus having a processor and a memory, the processor being adapted to perform the steps of:

obtaining a parking location and a destination, wherein the destination is automatically determined by a positioning device after a predetermined time has elapsed after a vehicle was parked;

computing a distance between the parking location and the destination;

determining a parking occupancy based on the distance; and outputting the parking occupancy.

35. A computer program product comprising a computer readable storage medium retaining program instructions, which program instructions when read by a processor, cause the processor to perform a method comprising:

obtaining a parking location and a destination, wherein the destination is determined based on user input prior to parking, wherein the parking location is determined after parking;

computing a distance between the parking location and the destination;

determining a parking occupancy based on the distance; and outputting the parking occupancy.

36. The computer program product of claim 35, wherein the parking location is associated with a time, wherein the parking occupancy is associated with the time.

37. A computerized apparatus having a processor and a memory, the processor being adapted to perform the steps of:

obtaining a parking location and a destination, wherein the destination is determined based on user input prior to parking, wherein the parking location is determined after parking;

computing a distance between the parking location and the destination;

determining a parking occupancy based on the distance; and outputting the parking occupancy.

38. The computerized apparatus of claim 37, wherein the parking location is associated with a time, wherein the parking occupancy is associated with the time.

39. A computer program product comprising a computer readable storage medium retaining program instructions, which program instructions when read by a processor, cause the processor to perform a method comprising:

obtaining a parking location and a destination;

computing a distance between the parking location and the destination;

obtaining a parking curve indicative of number of used parking spots at a parking zone at different times, wherein the parking curve is defined based on a parking usage dataset which comprises a plurality of records, wherein each record comprises a parking spot location, a parking start time, and a parking end time, wherein the parking usage dataset is a sample of the usage of parking spots by vehicles parking at the parking zone; determining the parking occupancy of a target location based on a combination of the distance and the parking curve;

determining a parking occupancy based on the distance; and outputting the parking occupancy.

40. A computerized apparatus having a processor and a memory, the processor being adapted to perform the steps of:

obtaining a parking location and a destination;

computing a distance between the parking location and the destination;

obtaining a parking curve indicative of number of used parking spots at a parking zone at different times, wherein the parking curve is defined based on a parking usage dataset which comprises a plurality of records, wherein each record comprises a parking spot location, a parking start time, and a parking end time, wherein the parking usage dataset is a sample of the usage of parking spots by vehicles parking at the parking zone; determining the parking occupancy of a target location based on a combination of the distance and the parking curve;

determining a parking occupancy based on the distance; and outputting the parking occupancy.

41. A computer program product comprising a computer readable storage medium retaining program instructions, which program instructions when read by a processor, cause the processor to perform a method comprising:

obtaining a location of a paid parking lot and a time of parking in the paid parking lot;

obtaining a target location for which parking occupancy is to be computed;

computing a distance between the target location and the location of the paid parking lot;

determining a parking occupancy based on the distance, wherein the parking occupancy is proportional to the distance, whereby a parking instance in the paid parking lot is used to estimate parking occupancy outside the paid parking lot; and outputting the parking occupancy.

42. The computer program product of claim 41, wherein said determining the parking occupancy comprises:

determining a parking lot occupancy circle that is defined by a center and a radius, wherein the center is the location of the paid parking lot, wherein the radius is a predetermined radius; and with respect to the target location that is comprised by the occupancy circle, determining the parking occupancy for the target location based on a distance between the center and the target location.

43. A computerized apparatus having a processor and a memory, the processor being adapted to perform the steps of:

obtaining a location of a paid parking lot and a time of parking in the paid parking lot;

obtaining a target location for which parking occupancy is to be computed;

computing a distance between the target location and the location of the paid parking lot;

determining a parking occupancy based on the distance, wherein the parking occupancy is proportional to the distance, whereby a parking instance in the paid parking lot is used to estimate parking occupancy outside the paid parking lot; and outputting the parking occupancy.

44. The computerized apparatus of claim 43, wherein said determining the parking occupancy comprises:

determining a parking lot occupancy circle that is defined by a center and a radius, wherein the center is the location of the paid parking lot, wherein the radius is a predetermined radius; and with respect to the target location that is comprised by the occupancy circle, determining the parking occupancy for the target location based on a distance between the center and the target location.

45. A computer program product comprising a computer readable storage medium retaining program instructions, which program instructions when read by a processor, cause the processor to perform a method comprising:

determining that a vehicle that is driving is searching for a parking space;

tracking a route of the vehicle while searching for the parking space;

determining a parking occupancy for a target location based on the route of the vehicle, wherein said determining the parking occupancy comprises:

determining that the target location is occupied based on the route passing the target location; and outputting the parking occupancy.

46. The computer program product of claim 45, wherein said determining that the vehicle is searching for a parking space comprises:

determining, by a positioning device, locations of the vehicle at different times; and based on the locations, identifying that the vehicle has passed through a same location twice within a predetermined timeframe, wherein the predetermined timeframe is shorter than an hour.

47. The computer program product of claim 45, wherein said determining that the vehicle is searching for a parking space comprises:

determining, by a positioning device, locations of the vehicle at different times; and based on the locations, identifying that the vehicle is approximated as circling a target location within a predetermined timeframe, wherein the predetermined timeframe is shorter than an hour.

48. A computerized apparatus having a processor and a memory, the processor being adapted to perform the steps of:

determining that a vehicle that is driving is searching for a parking space;

tracking a route of the vehicle while searching for the parking space;

determining a parking occupancy for a target location based on the route of the vehicle, wherein said determining the parking occupancy comprises:

determining that the target location is occupied based on the route passing the target location; and outputting the parking occupancy.

49. The computerized apparatus of claim 48, wherein said determining that the vehicle is searching for a parking space comprises:

determining, by a positioning device, locations of the vehicle at different times; and based on the locations, identifying that the vehicle has passed through a same location twice within a predetermined timeframe, wherein the predetermined timeframe is shorter than an hour.

50. The computerized apparatus of claim 48, wherein said determining that the vehicle is searching for a parking space comprises:

determining, by a positioning device, locations of the vehicle at different times; and based on the locations, identifying that the vehicle is approximated as circling a target location within a predetermined timeframe, wherein the predetermined timeframe is shorter than an hour.

51. A computer program product comprising a computer readable storage medium retaining program instructions, which program instructions when read by a processor, cause the processor to perform a method comprising:

determining that a vehicle that is driving is searching for a parking space;

tracking a route of the vehicle while searching for the parking space;

determining a parking occupancy for a target location based on the route of the vehicle, wherein said determining the parking occupancy comprises:

determining an occupancy circle in which the route of the vehicle has passed, wherein a center of the occupancy circle is a destination of the vehicle; and wherein the parking occupancy within the occupancy circle is defined based on a time elapsed while the searching for the parking space; and outputting the parking occupancy.

52. A computerized apparatus having a processor and a memory, the processor being adapted to perform the steps of:

determining that a vehicle that is driving is searching for a parking space;

tracking a route of the vehicle while searching for the parking space;

determining a parking occupancy for a target location based on the route of the vehicle, wherein said determining the parking occupancy comprises:

determining an occupancy circle in which the route of the vehicle has passed, wherein a center of the occupancy circle is a destination of the vehicle; and wherein the parking occupancy within the occupancy circle is defined based on a time elapsed while the searching for the parking space; and outputting the parking occupancy.

53. A computer program product comprising a computer readable storage medium retaining program instructions, which program instructions when read by a processor, cause the processor to perform a method comprising:

obtaining from a plurality of mobile devices of users, a plurality of parking instances, wherein each parking instance comprises a parking location and a parking time;

receiving from a user a target destination or indication thereof;

ranking a set of parking areas at a target time, wherein the set of parking areas are parking areas in a vicinity of the target destination, wherein the set of parking areas are parking areas that are within a predetermined radius of the target destination, wherein said ranking comprises: computing a popularity measurement of each parking area at the target time based on the plurality of parking instances; and outputting an indication to a user of said ranking.

54. A computerized apparatus having a processor and a memory, the processor being adapted to perform the steps of:

obtaining from a plurality of mobile devices of users, a plurality of parking instances, wherein each parking instance comprises a parking location and a parking time;

receiving from a user a target destination or indication thereof;

ranking a set of parking areas at a target time, wherein the set of parking areas are parking areas in a vicinity of the target destination, wherein the set of parking areas are parking areas that are within a predetermined radius of the target destination, wherein said ranking comprises: computing a popularity measurement of each parking area at the target time based on the plurality of parking instances; and outputting an indication to a user of said ranking.

55. A computer program product comprising a computer readable storage medium retaining program instructions, which program instructions when read by a processor, cause the processor to perform a method comprising:

obtaining from a plurality of mobile devices of users, a plurality of parking instances, wherein each parking instance comprises a parking location and a parking time;

receiving from a user a target destination or indication thereof;

ranking a set of parking areas at a target time, wherein the set of parking areas are parking areas in a vicinity of the target destination, wherein the set of parking areas are parking areas that are within a predetermined effective distance of the target destination, wherein said ranking comprises:

computing a popularity measurement of each parking area at the target time based on the plurality of parking instances; and outputting an indication to a user of said ranking.

56. The computer program product of claim 55, wherein said method further comprising:

receiving from a user a target destination or indication thereof; and wherein the set of parking areas are parking areas in a vicinity of the target destination.

57. The computer program product claim 56, wherein said outputting comprises providing to the user directions towards a top-ranked parking area.

58. A computerized apparatus having a processor and a memory, the processor being adapted to perform the steps of:

obtaining from a plurality of mobile devices of users, a plurality of parking instances, wherein each parking instance comprises a parking location and a parking time; receiving from a user a target destination or indication thereof;

ranking a set of parking areas at a target time, wherein the set of parking areas are parking areas in a vicinity of the target destination, wherein the set of parking areas are parking areas that are within a predetermined effective distance of the target destination, wherein said ranking comprises:

computing a popularity measurement of each parking area at the target time based on the plurality of parking instances; and outputting an indication to a user of said ranking.

59. The computerized apparatus of claim 58, wherein the processor is further adapted to perform:

receiving from a user a target destination or indication thereof; and wherein the set of parking areas are parking areas in a vicinity of the target destination.

60. The computerized apparatus of claim 59, wherein said outputting comprises providing to the user directions towards a top-ranked parking area.

* * * * *